(12) United States Patent
Andrusiak et al.

(10) Patent No.: US 6,806,825 B2
(45) Date of Patent: Oct. 19, 2004

(54) THIN CLIENT RADAR AND MULTIMEDIA NETWORKING

(75) Inventors: Martin J. Andrusiak, St. Paul, MN (US); Scott J. Benjamin, Lakeville, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/143,604

(22) Filed: May 9, 2002

(65) Prior Publication Data

US 2003/0210183 A1 Nov. 13, 2003

(51) Int. Cl.[7] ................................................ G01S 7/06
(52) U.S. Cl. ........................... 342/185; 342/58; 342/59; 342/179; 342/197
(58) Field of Search .................... 342/185; 709/203, 709/217–219, 249–250

(56) References Cited

U.S. PATENT DOCUMENTS

| | | | |
|---|---|---|---|
| 5,923,285 A | 7/1999 | Andrusiak et al. | 342/177 |
| 6,140,955 A * | 10/2000 | Andrusiak et al. | 342/185 |
| 6,211,814 B1 | 4/2001 | Benjamin et al. | 342/185 |
| 6,336,137 B1 * | 1/2002 | Lee et al. | 709/219 |
| 6,404,384 B1 * | 6/2002 | Tsao et al. | 342/185 |
| 6,507,833 B1 * | 1/2003 | Hichwa et al. | 707/1 |
| 6,526,377 B1 * | 2/2003 | Bubb | 704/211 |
| 6,526,439 B1 * | 2/2003 | Rossmann et al. | 709/219 |
| 6,542,740 B1 * | 4/2003 | Olgaard et al. | 455/432 |

* cited by examiner

Primary Examiner—John B. Sotomayor
Assistant Examiner—Isam Alsomiri
(74) Attorney, Agent, or Firm—Glenn Bowen; Kevin Cyr

(57) ABSTRACT

A radar scan conversion protocol is defined to communicate radar data from application servers to thin clients with reduced network bandwidth requirements. The radar scan conversion protocol may be implemented as an extension to existing thin client protocols. The system is also capable of transmitting audio and video data through the application servers to the thin clients using appropriate compressed formats in order to minimize network bandwidth requirements.

26 Claims, 1 Drawing Sheet

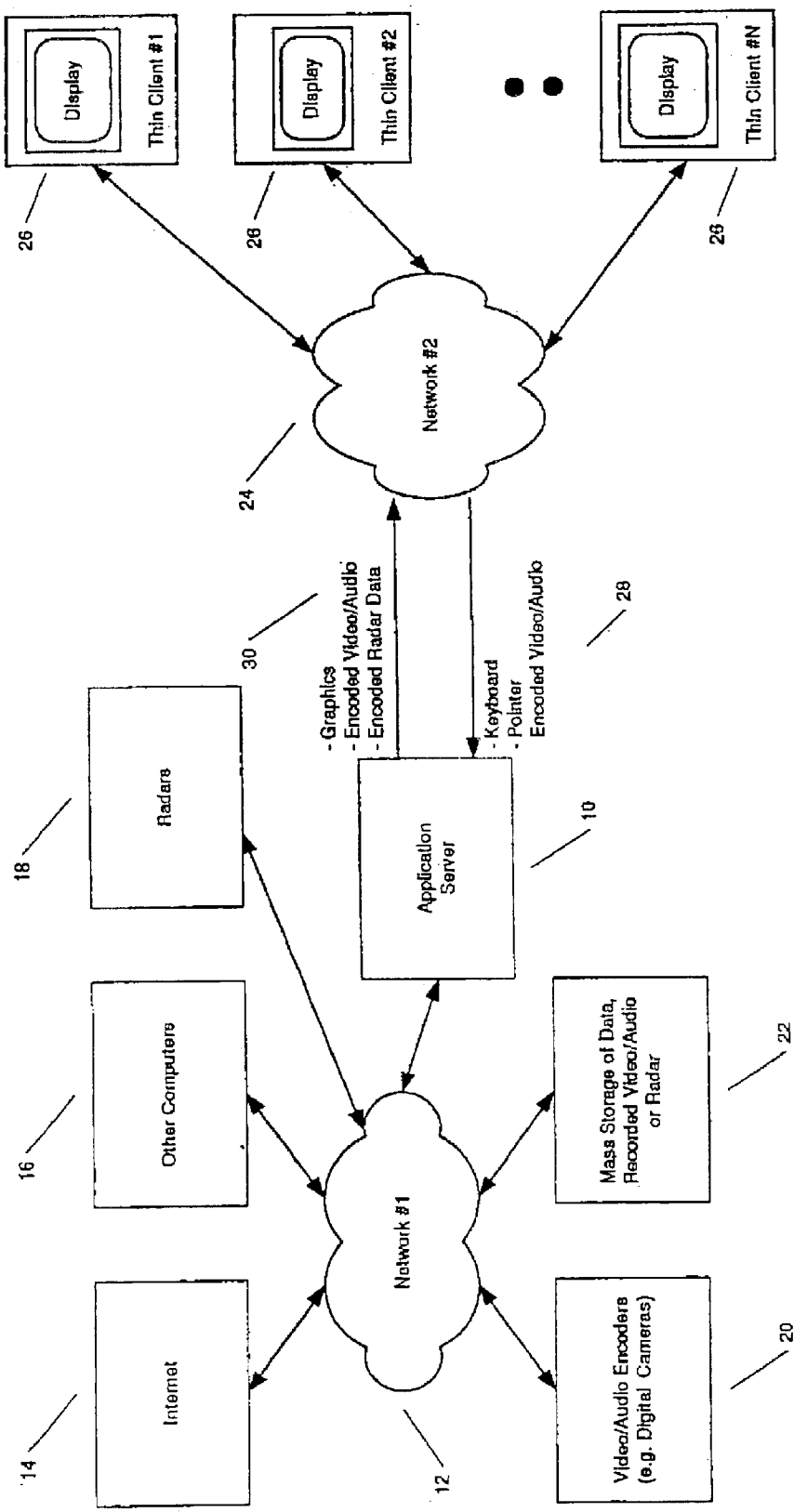

THIN CLIENT RADAR AND MULTIMEDIA NETWORKING

COPYRIGHT NOTICE

Tables I, II, and III of this patent document are subject to copyright protection. The copyright owner has no objection to the reproduction of the patent disclosure as it appears in this patent or, in the Patent and Trademark Office patent files or records, but otherwise reserves all copyright rights.

BACKGROUND OF THE INVENTION

The invention relates generally to client/server based computer systems and more particularly to the architecture of client/server based, network-coupled systems that are capable of providing multi-media displays including text, graphics, video, audio and scan converted radar on thin client displays. The invention also relates to the means by which multi-media and radar data are communicated between an application server computer and a thin client computer and how data are displayed on the thin client computer.

Computer system user interfaces have had several different architectures since their invention. Early computers used lights and buttons, or punch cards and printers to provide the user interface. Mainframe computers have traditionally used cathode ray tube (CRT) terminals that provided the user interface. The mainframe system was characterized by the fact that application programs run on the centralized computer housed in the computer center and users would interface to the computer via the display terminals and printers. A protocol was standardized for communication of output, or display commands and input or keyboard signals.

The invention of the personal computer changed the architecture to one where the computer processor and user interface devices were all highly integrated and co-located with the operator. The evolution of personal computers included the development of graphical user interfaces and pointing devices. The development of local area networks made it possible for many personal computers to share information easily in a distributed system. In many businesses, file server computers have been used to centralize the program and data storage. In this architecture, programs are downloaded from the file server to the desktop computer and executed. Data are often stored on the file server to allow easier system backups.

The continuing evolution of computer processing power and network bandwidth, combined with the increasing complexity of application software and operating systems has led to high system administration costs. The client/server system model using thin client displays is intended to reduce these rising costs and simplify system administration.

The client/server system architecture can be extended beyond the file server model to the application server model. The application server model is really a step back to the centralized mainframe system architecture except that the display terminals (thin clients) now provide a graphical user interface instead of just text and the mainframe is replaced by modern high performance application server computers. The communication between the client and server may be over phone lines, local area networks, or wide area networks.

The X windowing system was one of the first client/server display architectures, and is the dominant architecture on Unix-based operating systems. The objective of the X windowing system was to separate the processing of the user interface from the application program. The user interface is processed by a program called the X server which runs on the client processor. The application program, also called the X client, runs on an application processor. The X windowing system is most commonly used in distributed computing systems and it allows users to execute programs on a different computer than the operator interface computer. The X windowing system protocol for communication between the X client and the X server provides an efficient set of commands for exchanging display, keyboard and pointer actions.

A number of computer companies have developed competing protocols for exchanging display, keyboard and pointer actions. All share the same purpose of separating the computer running the application program from the computer performing the user interface functions.

The thin client system architectures that exist today have been focused on very low cost client hardware and low bandwidth network protocols. The primary applications include typical office uses such as database terminals, word processing, spread sheets and the like, that are characterized primarily by text and graphical content with fairly low rates of change. These systems benefit greatly from the reduced administration costs of the thin clients.

The benefits of the thin client architecture can also be extended to multi-media applications including radar display, video display and audio communication. Applications requiring these capabilities include military command and control systems, teleconferencing systems, interactive training systems, and even entertainment systems. These kinds of multi-media applications place increased demand on thin client computer systems because of the high bandwidth and processing load required to perform them. The present invention provides a solution to the problem of integrating multi-media capabilities into a thin client computing system.

Recent developments in digital television have resulted in several standards such as MPEG-1 and MPEG-2 from the Motion Pictures Experts Group that provide the means to compress digitized video so that it is feasible to transmit this data on a modern high performance digital network. Decompression of this video in a server before transmission to a client display is a problem because the bandwidth required for the decompressed data is very high. The decompression process may also require custom hardware to accomplish.

U.S. Pat. No. 5,923,285 entitled "Low Bandwidth Digital Radar Video Distribution System," issued Jul. 13, 1999 to Martin J. Andrusiak, et al. describes a system architecture for distribution of digitized radar video on a modern computer network. This system architecture enables software scan conversion within a general purpose computer, by eliminating the need for dedicated hardware within the general purpose computer to capture and convert the radar video and azimuth signals from analog to digital form. It also improves the feasibility of software scan conversion within a general purpose computer because it substantially reduces the amount of data that needs to be processed for display.

U.S. Pat. No. 6,211,814 entitled "Method for Software Scan Conversion of Target Identification Data in a General Purpose Computer," issued Apr. 3, 2001 in the name of Scott J. Benjamin, et. al., describes a method for software based radar scan conversion that may be used for scan conversion in conjunction with the radar video distribution system of U.S. Pat. No. 5,923,285. The present invention enables the features of the scan conversion method of this application to be extended to thin client networks.

BRIEF SUMMARY OF THE INVENTION

A radar scan conversion protocol is presented to allow thin client displays to perform radar scan conversion in conjunction with applications servers. The radar scan conversion protocol is defined such that the protocol information is in a compressed format which is expanded at the client for rendering of the radar display. This protocol may be implemented as an extension to a thin client protocol in order to pass radar video from the server to the client using minimal network bandwidth. In addition, the thin client may support communication of video and audio that may also be compressed (for transmission to the server) or decompressed (for display from the server) within the thin client. This thin client architecture is then capable of providing integrated graphics, radar, video and audio for military command and control, video conferencing, interactive training and entertainment (movies, radio) as well as general purpose computing.

BRIEF DESCRIPTION OF THE DRAWING

The present invention is described by reference to the drawing in which:

The FIGURE is an overall flow diagram of a process that implements the processing technique of the present invention.

DETAILED DESCRIPTION OF THE INVENTION

A process flow for realizing the technique of the present invention is depicted in the FIGURE. An application server or servers 10 sits between two networks or network segments. One network or network segment 12, provides access to an array of networked services such as, but not limited to, the Internet 14, other computers 16, radars 18, audio and video encoders 20, or mass storage devices containing recorded digital data including audio, video, or radar information 22. The second network or network segment 24, provides access to an array of thin client computers 26, whose application programs are executed by the application server 10 connected to both of the networks with the thin client computers 26 providing the user interface. The two networks are shown and described as being physically separate for clarity, however they may be logical segments of the same network.

The application server 10 not only executes programs for the thin clients 26, but it also can provide the thin clients 26 with access to all the resources available on the networks attached to the application server 10. The application server 10 delivers data to the thin clients 26 including, but not limited to, graphics, encoded audio and video, and encoded radar 30, which are decoded and displayed by the thin clients 26. The thin clients 26 deliver data including, but not limited to, keyboard and control signals, pointer, and encoded audio and video data to the application server 10.

The application server 10 processes compressed digital radar data which includes both video and azimuth data, into radar pixel data and line segment display parameters. Radar pixel data is data from the application server and it corresponds to pixel values to be drawn on the screen, while compressed digital radar data arriving at the aplication server 10 corresponds to the intensity of the received radar video.

The thin client may use the following known resources to provide the functions described. It has a keyboard and pointer or equivalent manual input devices. It may have a camera, microphone, video encoder and audio encoder to capture video and audio that could be used for video teleconferencing. It has a processor and network interface to manipulate and move digital data. It has a display such as a flat panel or CRT that receives pixel data from a graphics system. The graphics system may include digital graphics memory, a digital video decoder that decodes digital video for display, a digital audio decoder that plays through speakers, a digital radar decoder that decodes digital radar data for display and a data mixing capability that allows graphics, video and radar data to be integrated into a unified display image. It may also have interfaces for peripheral devices such as printers, scanners, mass storage, and the like. The encoders and decoders for video, audio and radar may utilize either custom hardware based methods or software based methods. Custom hardware methods provide substantially higher system performance since multiple encoding and decoding tasks are performed simultaneously instead of serially as on a general purpose processor. These are real-time problems so high performance is necessary to provide uninterrupted processing. These features may be implemented by technologies known to those skilled in the art.

The system architecture described in U.S. Pat. No. 5,923,285 of the invention of this document, and this patent is hereby incorporated by reference into this document. The entire "Description of the Preferred Embodiment" section and all of the drawings of U.S. Pat. No. 5,923,285 are relevant to this incorporation.

The following algorithms implement a thin client protocol extension for radar scan conversion, which retains the advantages of the system architecture of the Andrusiak et. al. U.S. Pat. No. 5,923,285. The radars 18 may include radar processors of the type described in U.S. Pat. No. 5,923,285, so that the transmission of digital data to application server 10, occurs at a low bandwidth point of the scan conversion process. The scan conversion process described in the Benjamin et. al. U.S. Pat. No. 6,211,814 involves polar processing functions (input) and line drawing functions (output). The objective of this process is to define a graphic function that is optimized to solve the unique radial line drawing function for radar scan conversion.

The present invention places the line drawing functions in the thin clients, and the polar processing functions in the application server 10. The modified process utilizes the new radar scan conversion protocol extension components of Table I to pass a buffer of radar pixel data with a set of line drawing parameters to the thin client where the same buffer of data is drawn in one or more line segments as necessary to provide a hole-filled display. These line drawing parameters include the starting coordinates and slope of each line segment and a pointer to the data elements corresponding to the start and end of the line segment. Therefore, the bandwidth required between the thin client and application processor is comparable to the bandwidth required for the Andrusiak, et. al. U.S. Pat. No. 5,923,285 and the architecture has the additional advantage of being able to use thin clients.

The radar scan conversion protocol extension algorithms may be implemented either in software or in custom hardware. A software approach may require substantial resources since the processor must be able to perform this task as well as all other thin client tasks. The hardware approach offloads the processing to a custom circuit that performs the task in parallel with other tasks performed by the processor. Whether the thin client uses custom hardware or not can be transparent to the application processor using the protocol extension. The thin client radar scan conversion protocol extension will be presented first followed by the supporting algorithms for the application server and finally the supporting algorithms for the thin client.

The following algorithms are derived with the following assumptions:

Let bam be the antenna angle using binary angle measurements counting clockwise from north, where the significant bits of bam is determined by the bam resolution denoted by radar_res, input_res, or output_res.

Let the amplitude of the echo at range r be written data[r] and the corresponding change flag be written flag[r].

Let rmin and rmax denote the end points of a half open range representing the minimum inclusive and maximum exclusive (respectively) ranges to be processed for the current data vector.

Let f2int( ) denote a function which rounds a floating-point value to the nearest integer value.

Let Client define a data type encapsulating the required information to access a remote procedure on the thin client.

Let GetRegionBound( ) denote a function that is implemented so that range is assigned to the hole-filled range based on the resolution region of the current fill radial bam number.

Let MAX_SEGMENTS denote a constant value computed to represent the maximum number of line segments to be drawn for each line of polar input data. This value is computed as (1<<x) where x is the largest allowable difference between output_res and input_res.

Let DrawPixel( ) denote a function that updates the Cartesian display memory with the new amplitude value of the pixel at the x,y coordinates. If the pixel value is −1 indicating no change, then the update is cancelled. The DrawPixel( ) function also determines the physical x,y pixel addresses based upon the display coordinate system and returns a non-zero value if the pixel coordinates are outside of the physical display area.

Let Max( ) denote a function that returns the maximum value of two numbers.

The radar scan conversion protocol extension is shown in Table I. The protocol extension is described as C language source for a header file that would be used to compile both the application server and thin client supporting algorithms. The thin client protocol provides a calling stub conforming to the DrawWedge function declaration in Table I. The mechanisms of the thin client protocol allow an invocation of the calling stub on the application server computer to generate a remote procedure call, causing execution of the corresponding function body on the thin client computer. The mechanisms of the thin client protocol convey the arguments passed to the DrawWedge calling stub from the server to the client. No particular thin client protocol is assumed since one skilled in the art may add this extension to any appropriate thin client protocol such as, but not limited to the X windowing system.

TABLE I

Radar Scan Conversion Protocol Extension 1. typedef struct {

TABLE I-continued

Radar Scan Conversion Protocol Extension 2. int    imin;
3. int    imax;
4. float x;
5. float dx;
6. float y;
7. float dy;
8. } WedgeSegment;
9.
10. extern int
11. DrawWedge (
12.   Client *           /* client     */,
13.   int *              /* data       */,
14.   int                /* ndata      */,
15.   int *              /* change     */,
16.   WedgeSegment *     /* segments   */,
17.   int                /* nsegments  */
18. );

Comments on Radar Scan Conversion Protocol Extension:
1. Begin the definition of a structure type of the line segment parameters.
2. Define the minimum data buffer index corresponding to the start of the line segment.
3. Define the maximum data buffer index corresponding to the end of the line segment.
4. Define the starting x coordinate of the line segment.
5. Define the slope of the line segment in the x direction.
6. Define the starting y coordinate of the line segment.
7. Define the slope of the line segment in the y direction.
8. Close the definition of the line segment structure and name it WedgeSegment.
9. Blank.
10. Begin the definition of a function prototype for drawing a set of line segments within the thin client using a return data type of int.
11. Name the function DrawWedge.
12. The first function parameter is a generic pointer to a client data structure that conforms to the mechanism for a thin client protocol.
13. The second function parameter is a pointer to the data buffer array.
14. The third function parameter is the number of items in the data buffer.
15. The fourth function parameter is a pointer to the change flag array.
16. The fifth function parameter is a pointer to the array of line segment parameter structures.
17. The sixth function parameter is the number of line segments.
18. Close the function prototype declaration.

The ApexScanConvert function shown in Table II executes on the application processor and calls the Draw-Wedge extension defined above to draw radar video on the thin client display. This function is modified from U.S. Pat. No. 6,211,814 including changes to the DrawApexWedge function to build the parameter values necessary to call the DrawWedge function defined in the protocol extension. Since the DrawStairCaseLine function described in Table III executes on the thin client, computation of the line segment parameters has been moved from the DrawStairCaseLine function to the ApexScanConvert function because these parameters are dependent upon configuration tables that only exist in the application processor. While the algorithms show these calculations being done repeatedly, a practical system would calculate these values once and store them in tables to improve performance.

TABLE II

ApexScanConvert( )Algorithm

```
 1. void
 2. DrawApexWedge(int bam, int input_res, int output_res,
      int rmin, int rmax, int *data, int *flag)
 3. {
 4.   int range, radials, i, n;
 5.   float theta, dx, dy, fx, fy;
 6.   WedgeSegment segments[MAX_SEGMENTS];
 7.
 8.   bam <<= output_res - input_res;
 9.
10.   radials = 1<<(output_res - input_res);
11.   n = 0;
12.   for (i = 0; i < radials; i++) {
13.     if (i == 0) {
14.       range = rmin;
15.     } else {
16.       range = GetRegionBound(bam+i, output_res);
17.       range = max(rmin, range);
18.     }
19.
20.     if (range < rmax) {
21.       theta = ((float)bam/ (1<<output_res)) *two_pi;
22.       dx = cos(theta);
23.       dy = sin(theta);
24.       fx = (range+0.5) * dx;
25.       fy = (range+0.5) * dy;
26.
27.       segments[n].imin  = range-rmin;
28.       segments[n].imax  = rmax-rmin;
29.       segments[n].x     = fx;
30.       segments[n].dx    = dx;
31.       segments[n].y     = fy;
32.       segments[n].dy    = dy;
33.       n++;
34.     }
35.   }
36.   DrawWedge(client, data, (rmax-rmin), flag, segments,
        n);
37. }
```

Comments on Function DrawApexWedge( ):
1. Defines the calling syntax of the function.
2. The function body begins here.
3. Declare integer variables used in this function.
4. Declare floating point variables used in this function.
5. Declare an array of WedgeSegment structures used in this function.
6. Blank.
7. Convert the bam number from input resolution to output resolution.
8. Blank.
9. radials is assigned two raised to the power of the difference between the output and input resolutions. This is the number of radials for the current wedge.
10. Initialize the number of segments, n, to zero.
11. Loop of instructions to generate the line segment structures.
12. Test for primary radial.
13. Start current wedge segment from range=rmin.
14. Else case for not primary radial.
15. range is assigned the hole-filled range based on the resolution region of the current fill radial bam number.
16. Start current wedge segment from rmin or range, whichever is greater.
17. End of if-else clause from line 13.
18. Blank.
19. Test for valid segment length.
20. theta is assigned the bam number converted to radians.
21. dx is assigned the cosine of theta.
22. dy is assigned the sine of theta.
23. fx is assigned the x coordinate corresponding to range.
24. fy is assigned the y coordinate corresponding to range.
25. Blank.
26. For the current segment, imin is set to the index of the data value corresponding to the value of range.
27. For the current segment, imax is set to the index of the data value corresponding to the value of rmax.
28. For the current segment,
29. For the current segment, x is set to the initial x coordinate.
30. For the current segment, dx is set to the x coordinate increment value.
31. For the current segment, y is set to the initial y coordinate.
32. For the current segment, dy is set to the y coordinate increment value.
33. End of if clause from line 20.
34. End of loop from line 12.
35. Call remote procedure on client machine to draw wedge defined by segment data.
36. The function body ends here.

```
 1. void
 2. ApexScanConvert(int radar_res, int input_res, int
      output_res)
 3. {
 4.   int bam, rmin, rmax;
 5.   int data[MAX_LENGTH];
 6.   int flag[MAX_LENGTH];
 7.
 8.   while (TRUE) {
 9.     GetDrawData(&bam, radar_res, input_res,
          &rmin, &rmax, data, flag);
10.     DrawApexWedge(bam, input_res, output_res,
          rmin, rmax, data, flag);
11.   }
12. }
```

Comments on function ApexScanConvert( ):
1. Indicates that the function does not return a value.
2. Defines the calling syntax of the function.
3. The function body begins here.
4. Declare integer variables used in this function.
5. Declare array to buffer radar input data.
6. Declare array to buffer radar input change flag data.
7. Blank
8. Begin loop to process data forever.
9. Call function GetDrawData( ) to get the next radar input and array of return values with bam resolution defined by input resolution.
10. Call function DrawApexWedge( ) to draw the received radar data at the input resolution starting at rmin, with hole-filling to the output resolution.
11. The loop ends here.
12. The function body ends here.

The DrawWedge algorithm, shown in Table III, is modified from the DrawStairCaseLine function in the Benjamin, et. al. U.S. Pat. No. 6,211,814 to remove the calculation of the line drawing parameters that are placed in the ApexScanConvert function when executing on the application processor. The DrawWedge function executes on the thin client as a remote procedure call initiated by an invocation of the calling stub on the application server via the mechanisms of the thin client protocol. The DrawWedge function provides a loop to call the DrawStairCaseLine function for each of the line segments passed to it from the ApexScanConvert function in the application processor. Since these algorithms would be implemented as part of a thin client protocol, there are other protocol communication functions that may be required, such as checking for the existence of the protocol extension on the thin client and initialization or configuration of the thin client protocol network communication. The implementation of these communication functions will be obvious to one skilled in the art.

TABLE III

DrawWedge( ) Algorithm

```
1. void
2. DrawStaircaseLine(int *data, int *flag, WedgeSegment
     *segment)
3. {
4.   float dx, dy, fx, fy;
5.   int imin, imax, i;
6.   int x, old_x, y, old_y, old_data, new_data;
7.
8.   imin = segment->imin;
9.   imax = segment->imax;
10.  fx = segment->x;
11.  dx = segment->dx;
12.  fy = segment->y;
13.  dy = segment->dy;
14.  old_x = f2int(fx);
15.  old_y = f2int(fy);
16.  old_data = flag[imin] ? data[imin] : -1;
17.  for (i = imin; i < imax;) {
18.     i++;
19.     x = f2int(fx);
20.     y = f2int(fy);
21.     if ((old_y == y) && (old_x == x)) {
22.        new_data = flag[i] ? data[i] : -1;
23.        old_data = max(old_data, new_data);
24.     } else {
25.        if (DrawPixel(old_x, old_y, old_data[i]))
26.           break;
27.        if ((old_y != y) && (old_x != x))
28.           if (Drawpixel(x, old_y, old_data[i]))
29.              break;
30.        old_data = flag[i] ? data[i] : -1;
31.     }
32.     old_x = x;
33.     old_y = y;
34.     fx += dx;
35.     fy += dy;
36.  }
37. }
```

Comments on Function DrawStaircaseLine( ):
1. Indicates the function does not return a value.
2. Defines the calling syntax of the function.
3. The function body begins here.
4. Declare floating-point variables used in this function.
5. Declare integer variables used in this function.
6. Declare integer variables used in this function.
7. Blank.
8. Variable imin is assigned the starting data buffer index.
9. Variable imax is assigned the ending data buffer index.
10. Variable fx is assigned the starting x coordinate.
11. Variable dx is assigned the slope on the x axis.
12. Variable fy is assigned the starting y coordinate.
13. Variable dy is assigned the slope on the y axis.
14. old_x is initialized to the starting x coordinate converted to an integer.
15. old_y is initialized to the starting y coordinate converted to an integer.
16. old_data is initialized to the starting data value or −1 if the corresponding flag indicates no change.
17. A loop of instructions to compute the Cartesian coordinates and plot the polar data samples from Rmin through Rmax.
18. The loop counter is incremented
19. The x coordinate is converted from floating point to integer.
20. The y coordinate is converted from floating point to integer.
21. Detects a second pixel maps to the same coordinate as the previous pixel.
22. Determines the new pixel value based on the change flag as in line 16.
23. Stores the maximum of the pixels mapping to the same coordinate for the next loop iteration.
24. The if body of 21 ends and the else condition begins.
25. The appropriate value in the data array is plotted on the display at coordinates given by (old_x, old_y).
26. Break out of the loop if the pixel is outside the display area.
27. Detects a 'stairstep' given by both x and y coordinates changing.
28. An extra pixel is plotted at coordinate (x, old_y).
29. Break out of the loop if the pixel is outside the display area.
30. Determines the new pixel value based on the change flag as in line 16 and stores it for the next loop iteration.
31. The else body of 24 ends here.
32. The x coordinate is saved for the next loop iteration.
33. The y coordinate is saved for the next loop iteration.
34. x is incremented by the value dx.
35. fy is incremented by the value dy.
36. The loop of 17 ends here.
37. The function body ends here.

```
1. void
2. DrawWedge(Client *client, int *data, int ndata, int
     *flag, WedgeSegment *segments, int nsegments)
3. {
4.   int i;
5.
6.   for (i = 0; i < nsegments; i++)
7.      DrawStairCaseLine(data, flag, segment+i);
8. }
```

Comments on Function DrawWedge( ):
1. Indicates that the function does not return a value.
2. Defines the calling syntax of the function. The Client variable would be handled by the communication protocol.
3. The function body begins here.
4. Declare local loop counter variable.
5. Blank
6. Loop through number of segments passed to function.
7. Call DrawStairCase line for each segment to be drawn.
8. The function body ends here.

The problem of distributing video and audio over a network has resulted in the industry developing several standards for compressed digital representations of these types of data such as MPEG-1 and MPEG-2. Current computer technology can decode MPEG-1 format video in software but MPEG-2 video has higher resolution and frequently requires custom hardware to decode. The MPEG-1 format is typically used for distribution of video over the Internet where connection speeds are limited so bandwidth is critical. The MPEG-1 format is characterized by low resolution. The MPEG-2 format is required for full screen, full resolution video with minimal artifacts (losses). The MPEG-2 format requires higher bandwidth than the Internet can currently support for real-time distribution and display. Therefore, the thin client should be equipped to decode the MPEG video locally instead of in the application processor.

The MPEG-2 format is also a processor intensive task that is better suited to decoding in custom hardware. Since video and audio are inherently real-time processes, interruptions in processing may cause intolerable jitter in the presentation to the audience. For this reason, it is important that these tasks be allocated high priority within a thin client so that other thin client operations do not interrupt the video decoding process resulting in jitter. For example, a typical X server handles tasks on a first come-first serve basis. If the MPEG video were to be sent to the X server processing queue, it could get behind a long list of graphics or radar processing tasks and perform poorly. Data may be buffered in an attempt to smooth the presentation but buffering a large amount of data requires substantial memory and increases latency. Latency might not be a problem when replaying recorded video, but it could be a problem for live video such as video conferencing.

The MPEG formats were specifically designed to be easier to decode than encode under that assumption that there are millions of decoders and only a few encoders. While there may prove to be larger market for encoders than originally envisioned, the fact remains that the complexity of the encoding process also requires custom hardware to implement. This fact, combined with the need to conserve network bandwidth, would indicate that a thin client used for video teleconferencing would require custom encoding hardware.

To provide optimal performance in a thin client when simultaneous video decoding, radar line drawing and graphics are required, each of these functions preferably have its own memory (not shown) in the thin clients 26. This prevents the problem of sharing a common memory and having insufficient bus bandwidth to complete all the tasks. With each task having its own dedicated memory, the tasks can operate in parallel. In addition, these memories can be simultaneously read during the display update process (video refresh) and mixed.

We claim:

1. A radar scan conversion system comprising;
   (a) an application server computer implemented with software which:
      1. computes radar pixel data and line segment display parameters from compressed digital radar data derived from one or more polar coordinate radar data-producing sources, which are input to said application server computer, and
      2. provides a radar scan conversion protocol extension which defines the data structure by which said radar pixel data and sets of said computed line segment display parameters are output from said application server computer via remote procedure calls,
   (b) one, or more, thin client computers comprising a rectangular coordinate display and implemented with software which draws scan lines on said display in correspondence with said radar pixel data and computed line segment display parameters and said radar scan conversion protocol extensions, and
   (c) display-side network components coupled between said application server computer and said thin client computers for transmitting said radar pixel data and computed line segment display parameters via said remote procedure calls from said application server computer to said thin client computers.

2. A radar scan conversion system as claimed in claim 1, further comprising one or more radar servers, each of which generates said compressed digital radar data from said polar coordinate radar-producing sources.

3. A radar scan conversion system as claimed in claim 2, further comprising additional network components coupled between said radar servers and said application server computer for conveying said compressed digital radar and azimuth data from said radar servers to said application server computer.

4. A radar scan conversion system as claimed in claim 3, further comprising sources of video data wherein said application server computers are coupled through said display-side network components to said sources of video data to exchange video data and video control signals between said application server computer and said thin client computers.

5. A radar scan conversion system as claimed in claim 4, wherein said video sources supply said video data to said application server computer through said additional network components.

6. A radar scan conversion system as claimed in claim 5, wherein said video sources digitally compress said video data and said thin clients computers digitally decompress and display said video data.

7. A radar scan conversion system as claimed in claim 1, wherein said radar pixel data is indexed by range and said sets of line segment display parameters consist of,
   (a) radar pixel data range subset data;
   (b) initial rectangular coordinate data, and
   (c) line segment slope or angle data.

8. A radar scan conversion system as claimed in claim 1, wherein,
   (a) said radar pixel data is arranged into an array, and
   (b) one, or more, sets of line segment display parameters each comprise:
      1. values representing the minimum and maximum indices into said radar pixel data array to be drawn as a current line segment,
      2. values representing the initial rectangular coordinates for said current line segment, and
      3. values representing the slope to be used for drawing said current line segment.

9. A radar scan conversion system as claimed in claim 8, further comprising a change flags array corresponds to the values of said radar pixel data array, and are representative of said radar pixel data array values that have not been changed from the previous set of radar pixel data array values that were displayed with the same line segment display parameters.

10. A radar scan conversion system as claimed in claim 1, further comprising change flags correspond to the values of said radar pixel data, and are representative of said radar pixel data values that have not been changed from the previous set of radar pixel data values that were displayed with the same line segment display parameters.

11. A radar scan conversion system as claimed in claim 1, wherein said thin client computers couple data over said network components to said application server computer wherein said data may comprise audio, or video data, or both.

12. A radar scan conversion system comprising;
   (a) one, or more, application server computers,
   (b) one, or more, thin client computers, each comprising a display,
   (c) one, or more, radar data sources, each of which produces polar coordinate radar data and each of which comprises a processor which processes said polar coordinate radar data into compressed digital radar data,
   (d) a first set of network-components coupled to said processors for transmitting said compressed digital radar data to said application server computers,
   (e) a second set of network components coupled between said application server computers and said thin client computers for exchanging data and control signals, and (f) radar scan conversion protocol components installed on both said application server computers and said thin client computers, wherein, said application server computers utilize said compressed digital radar data and said protocol components to provide drawing parameter data to said thin client computers that are suitable for rectangular coordinate display in accordance with requests issued by said thin client computers via said second set of network components, and wherein said thin client computers use said drawing parameter data to provide rectangular coordinate presentations on said displays.

13. A radar scan conversion system as claimed in claim 12 further comprising video sources of remote video data, wherein said application server computers are coupled through said first set of network components to receive said remote video data and associated remote video control signals from said video sources, and are coupled through said second set of network components to exchange video data and video control signals between said thin client computers and said application server computers.

14. A radar scan conversion system as claimed in claim 12 further comprising audio sources of remote audio data, wherein said application server computers are coupled through said first set of network components to receive said remote audio data and associated remote audio control signals from said audio sources, and are coupled through said second set of network components to exchange audio data and audio control signals between said thin client computers and said application server computers.

15. A radar scan conversion system as claimed in claim 14, further comprising video sources of remote video data, wherein said application server computers are coupled through said first set of network components to receive said remote video data and associated remote video control signals from said video sources, and are coupled through said second set of network components to exchange video data and video control signals between said thin client computers and said application server computers.

16. A radar scan conversion system as claimed in claim 12, wherein said thin client computers couple data over said network components to said application server computers, wherein said data may comprise audio, or video signals, or both.

17. A radar scan conversion system comprising:
  (a) one, or more, application server computers,
  (b) one, or more, thin client computers, each comprising a display,
  (c) one, or more, radars each or which produces polar coordinate analog radar data and each of which comprises a processor which processes said analog radar data into compressed digital radar data, wherein said processors comprise;
    1. a video digitizer that is coupled to receive analog range and video data from an associated radar, and provides digital range and digital video data that is representative of said analog range and video data,
    2. an azimuth decoder that is coupled to receive analog azimuth data from an associated radar that is representative of the azimuth of one, or more antennas that are associated with said radar and that provides decoded azimuth digital data,
    3. a range compressor that coupled to receive said digital video data and range data and that compresses said digital video data and digital range data, and sorts said digital video data into range bins,
    4. a window detector coupled to receive said range bin sorted compressed digital video data and said decoded azimuth digital data for providing digital window detected data,
  (d) a first set of network components coupled to said processors for transmitting said compressed digital radar data to said application server computers,
  (e) a second set of network components coupled between said application server computers and said thin client computers for exchanging said digital window detected data and control signals, and
  (f) radar scan conversion protocol components installed on both said application server computers and said thin client computers wherein said application server computers utilize said compressed digital radar data and said protocol components to provide said window detected data to said thin client computes that are suitable for rectangular coordinate display in accordance with requests issued by said thin client computers via said second set of network components, and wherein said thin client computers use said window detected data to provide rectangular coordinate presentations on said displays.

18. A radar scan conversion system as claimed in claim 17, wherein said thin client computers couple data over said network components to said application server computers, wherein said data may comprise audio or video signals, or both.

19. A radar scan conversion system as claimed in claim 17, further comprising video sources of remote video data, wherein said application server computers are coupled to said first set of network components to receive said remote video data and associated remote video control signals from said video sources, and are coupled to said second set of network components to exchange video data and video control signals between said thin client computers and said application server computers.

20. A radar scan conversion system as claimed in claim 17, further comprising audio sources of remote audio data, wherein said application server computers are coupled to said first set of network components to receive said remote audio data and associated remote audio control signals from said audio sources, and are coupled to said second set of network components to exchange audio data and audio control signals between said thin client computers and said application server computers.

21. A radar scan conversion system as claimed in claim 20, further comprising video sources of remote video data wherein, said application server computers are coupled to said first set of network components to receive said remote video data and associated remote video control signals from said video sources, and are coupled to said second set of network components to exchange video data and video control signals between said thin client computers and said application server computers.

22. A method of converting polar coordinate radar data to rectangular coordinate digital data for display on a remote computer display comprising;
  (a) computing radar pixel data and line segment display parameters from compressed digital radar data derived from one or more polar coordinate radar data-producing sources on an application server computer,
  (b) providing a radar scan conversion protocol extension which defines the data structure by which said radar pixel data and sets of said computed line segment display parameters are output from said application server computer via remote procedure calls to said remote computer display, and (c) drawing scan lines on said remote computer display in correspondence with said radar pixel data and said computed line segment display parameters and said scan conversion protocol extensions.

23. A method as claimed in claim 22, wherein said radar pixel data is indexed by range and said sets of line segment display parameters consist of:
(d) radar pixel data range subset data;
(e) initial rectangular coordinate data, and
(f) line segment slope or angle data.

24. A method as claimed in claim 22, wherein:
(a) said radar pixel data is arranged into an array, and
(b) one, or more, sets of line segment display parameters each comprise:
  1. values representing the minimum and maximum indices into said radar pixel data array to be drawn as a current line segment,
  2. values representing the initial rectangular coordinates for said current line segment, and
  3. values representing the slope to be used for drawing said current line segment.

25. A method as claimed in claim 24, further comprising a change flags array corresponds to the values of said radar pixel data array, and are representative of said radar pixel data array values that have not been changed from the previous set of radar pixel data array values that were displayed with the same line segment display parameters.

26. A method as claimed in claim 22, further comprising a change flags correspond to the values of said radar pixel data, and are representative of said radar pixel data values that have not been changed from the previous set of radar pixel data values that were displayed with the same line segment display parameters.

* * * * *